(12) United States Patent  (10) Patent No.: US 6,736,555 B2
Takatori  (45) Date of Patent: May 18, 2004

(54) PHOTO FILM CARTRIDGE AND CAMERA (75) Inventor: Tetsuya Takatori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/303,773

(22) Filed: Nov. 26, 2002

(65) Prior Publication Data

US 2003/0099474 A1 May 29, 2003

(30) Foreign Application Priority Data

Nov. 28, 2001 (JP) ....................................... 2001-362981
Dec. 7, 2001 (JP) ....................................... 2001-374161

(51) Int. Cl.$^7$ ............................................. G03B 17/26
(52) U.S. Cl. ....................................................... 396/513
(58) Field of Search ................................. 396/511, 512, 396/513, 520, 535, 538

(56) References Cited

U.S. PATENT DOCUMENTS

| | | | | |
|---|---|---|---|---|
| 2,983,462 A | * | 5/1961 | Berlings | 396/512 |
| 3,451,322 A | * | 6/1969 | Noda et al. | 396/513 |
| 4,247,183 A | * | 1/1981 | Thompson | 396/511 |
| 4,992,814 A | * | 2/1991 | Hsiung | 396/512 |
| 5,206,676 A | * | 4/1993 | Mizuno et al. | 396/513 |
| RE35,856 E | * | 7/1998 | Pearson | 396/538 |
| 5,971,311 A | * | 10/1999 | Fujii et al. | 396/513 |
| 6,088,530 A | * | 7/2000 | Rydelek et al. | 396/538 |
| 6,447,176 B2 | * | 9/2002 | White et al. | 396/513 |
| 6,450,709 B1 | * | 9/2002 | Tatamiya | 396/513 |
| 2003/0086708 A1 | * | 5/2003 | Wang | 396/512 |

* cited by examiner

Primary Examiner—Christopher E Mahoney
(74) Attorney, Agent, or Firm—Young & Thompson (57) ABSTRACT A cartridge shell includes a film take-up unit for containing a cassette shell with a rotatable spool and a film supply unit for containing a roll of photo filmstrip one end of which is secured to the spool. Inside the film supply unit, light shielding members are provided in order to prevent an unexposed photo film roll from being exposed. Each of the film take-up unit and the film supply unit has a bridge, and the both bridges are movably fitted into each other. When the photo film cartridge is not used, both of the bridges are completely overlapped each other so that the cartridge shell becomes small in size for convenience of portability.

15 Claims, 10 Drawing Sheets

PHOTO FILM CARTRIDGE AND CAMERA

BACKGROUND OF THE INVENTION

1. Field of the Invention

The present invention relates to a photo film cartridge and a camera loaded therewith.

2. Background Arts

A well-known lens-fitted photo film unit is pre-loaded with a photo filmstrip at the time of manufacture. This lens-fitted photo film unit is widely used because of advantages that a user can take a photograph with easy operations just after purchase. The used lens-fitted photo film unit is collected by a maker, and disassembled into each functional unit or part. The functional unit or part is reused after inspections, or recycled as raw materials.

Various improvements have been made to the lens-fitted photo film units for the sake of increasing the reliability, so that some lens-fitted photo film units are reusable only by loading a new photo filmstrip therein. Thus, it is considered to turn the lens-fitted photo film unit into a simple camera, a photo film of which is easily changeable by a user. As for types of photo filmstrips employed in general cameras, 135-type and IX240-type have been widely used. Film processing systems in accordance with the photo filmstrips of ISO 135 or IX-240 format are installed in the great majority of photo labs, so it is possible to offer efficient printing service at a low cost.

The photo filmstrip of ISO 135 or IX-240 format is contained in a single-spool cassette. The cassette with the photo filmstrip is loaded into and taken out of the camera. Thus, in the general camera, the photo filmstrip has to be pulled out of the cassette frame-by-frame for photography, and then wound back to the cassette after making all exposures. Some cameras wind the photo filmstrip of all picture frames into a film roll chamber in advance of photography, and then take up the photo filmstrip frame-by-frame into the cassette every time a single exposure is made. For a lens-fitted photo film unit user, however, it is troublesome to wind all frames back after photography or to wind up all frames in advance.

Also a 110-type photo film cartridge is well known as a double-spool cartridge with a film roll chamber and a cassette chamber. Using the double-spool cartridge will make it easy to change a photo film because the wind back operation of all picture frames and wind up operation in advance are unnecessary. However, since the 110-type photo film cartridge has the film roll chamber and the cassette chamber, the cartridge itself is large in size, so that it is less convenient to carry anywhere. Also the 110-type photo film cartridge is not available to current film processing system suited for the 135-type and IX240-type photo filmstrips because of its specialty in shape, so that it will be difficult to carry out a film developing procedure efficiently.

SUMMARY OF THE INVENTION

An object of the present invention is to provide a photo film cartridge and a camera in which a loading and an ejection are easily carried out.

Another object of the present invention is to provide a photo film cartridge which is available to a current film development system to provide an efficient printing service at a low cost.

A further another object of the present invention is to provide a photo film cartridge which becomes small in size except when being loaded into a camera.

To achieve the above objects, in a photo film cartridge according to the present invention, a cartridge shell formed integrally out of plastic includes a cassette chamber for containing a cassette, a film roll chamber for containing a roll of photo filmstrip of ISO 135 or IX-240 format which is pulled out of the cassette, and abridge provided between the cassette chamber and the film roll chamber for guiding the photo filmstrip. In the bridge, there is formed an exposure frame for exposing a single picture frame of the photo filmstrip.

The photo film cartridge has a light shielding portion for preventing the unexposed photo filmstrip from being exposed. As the light shielding portion, for example, there is a pair pieces of plates with plush fixed between the film roll chamber and the exposure frame or a removable light shielding plate covering the front of the exposure frame.

In another embodiment a cartridge shell comprises two units, namely, a film take-up unit having a cassette chamber and a bridge, and a film supply unit having a film roll chamber and another bridge. In this case, one of the bridges is provided with a projection, and the other bridge is provided with a slot for engaging with the projection. Furthermore, the both bridges are movably fitted into each other within the confines of a length of the slot. Accordingly, except when the photo film cartridge is loaded into a camera, the cartridge shell becomes small in size for the sake of portability since the projection is positioned at one end of the slot. On the other hand, when loading the photo film cartridge into the camera, the cartridge shell becomes in a necessary size since the projection is positioned at the other end of the slot.

In each bridge a cutout is formed. When the bridges are fitted into each other, the cutouts of the both units form an exposure frame. When loading the photo film cartridge into the camera, the exposure frame is in a size of a single picture frame.

In addition to that, a click mechanism may be provided in both ends of the slot in order to secure the projection at either end of the slot. In this case, it is possible to handle the photo film cartridge with stability.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus are not limiting the present invention. In the drawings, same reference numerals designate like or corresponding parts throughout the several views, and wherein.

DETAILED DESCRIPTION OF THE EMBODIMENTS

Figure 1:
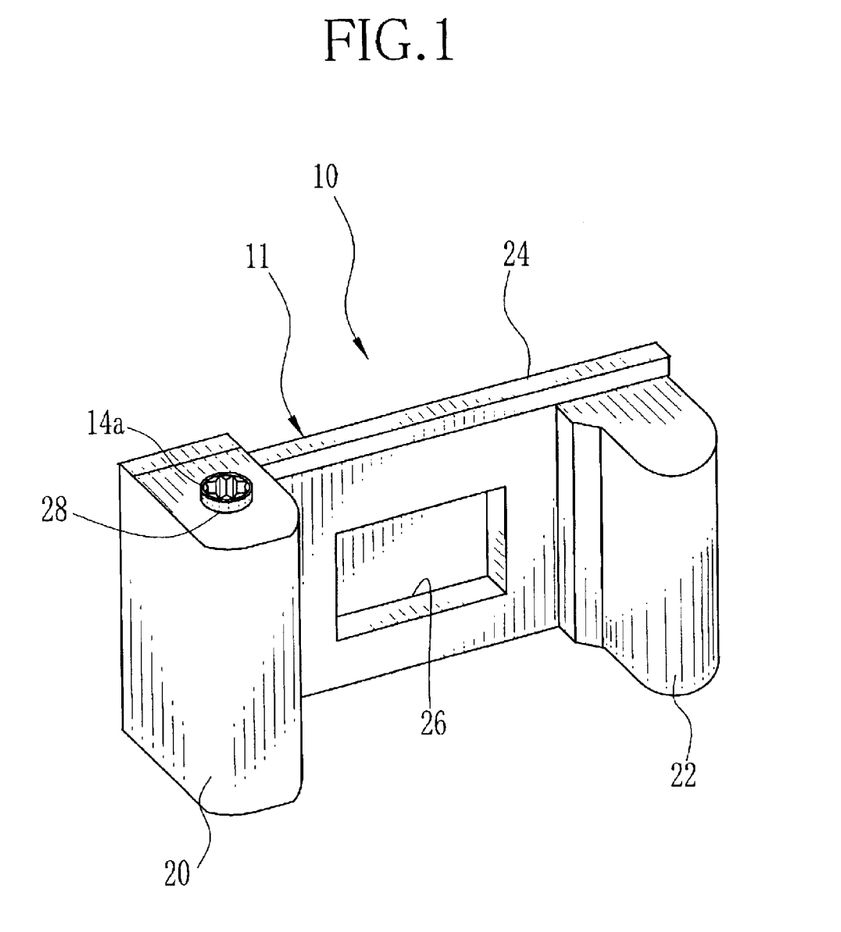
FIG. 1 is a front perspective view of a photo film cartridge of a first embodiment according to the present invention.
Figure 2:
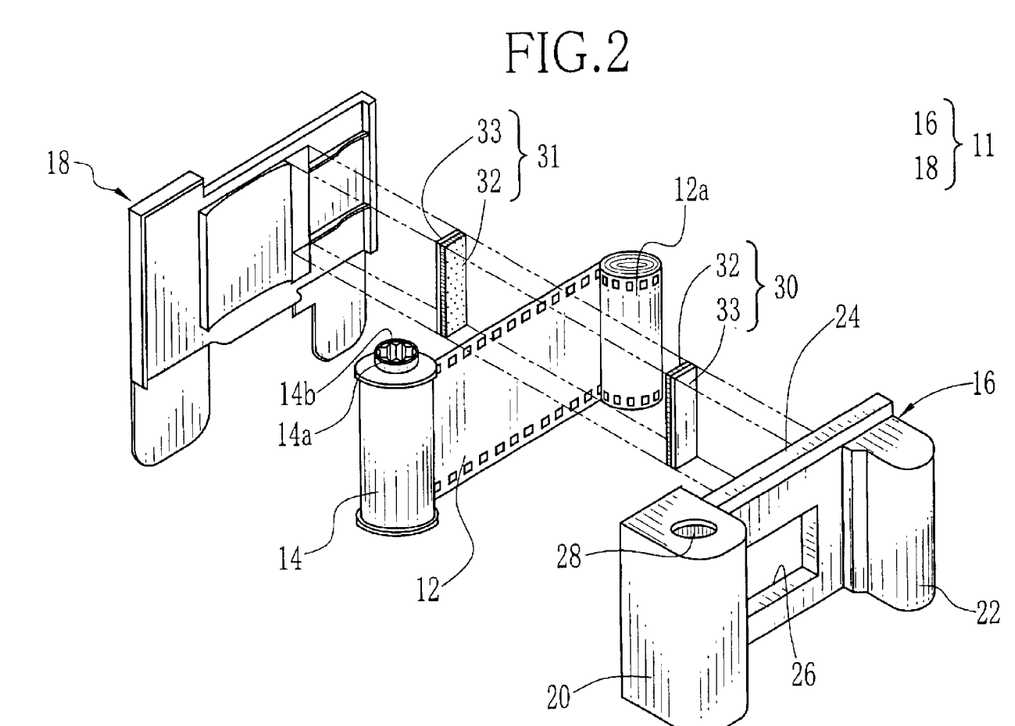
FIG. 2 is an exploded perspective view of the photo film cartridge of FIG. 1.

Referring to FIGS. 1 and 2, the photo film cartridge 10 comprises a cartridge shell 11 and a cassette shell 14 contained therein. The cartridge shell 11 consists of a holder container 16 and a rear cover 18 which covers a rear side of the holder container 16 light-tightly.

The holder container 16 integrally formed out of plastic has a cassette chamber 20 and a film roll chamber 22. In the cassette chamber 20, the cassette shell 14 with a spool 14a is contained. One end of a photo filmstrip 12 is secured to the spool 14a. The unexposed photo filmstrip 12 pulled out of the cassette shell 14 and rolled up is contained in the film roll chamber 22 as a photo film roll 12a. In this embodiment, the photo filmstrip 12 is a 135-type photo film in conformity with an International Organization for Standardization (ISO1007-1979).

A bridge 24 is provided between the cassette chamber 20 and the film roll chamber 22. The bridge 24 guides the photo filmstrip 12 drawn out of the film roll chamber 22 to the cassette chamber 20. An exposure frame 26 is formed in the bridge 24 to expose a single picture frame of the photo filmstrip 12 drawn out of the film roll chamber 22.

Between the film roll chamber 22 and the exposure frame 26, a pair of light shielding members 30 and 31 is disposed. Each of the light shielding members 30 and 31 has a metal plate 33 and a piece of plush 32 glued thereon. The metal plates 33 of the light shielding members 30 and 31 are secured to the holder container 16 and the rear cover 18 respectively, so that the photo filmstrip 12 is held between the plush 32 of the both light shielding members 30 and 31. Accordingly, the light shielding members 30 and 31 prevent the unexposed photo film roll 12a in the film roll chamber 22 from being exposed to light through the exposure frame 26.

On a top wall of the cassette chamber 20, an opening 28 for protruding the spool 14a is formed. When the cassette shell 14 is loaded into the holder container 16 from the underside, the spool 14a protrudes outside through the opening 28. A light shielding material like plush is glued on an inner periphery of the opening 28.

Figure 3:
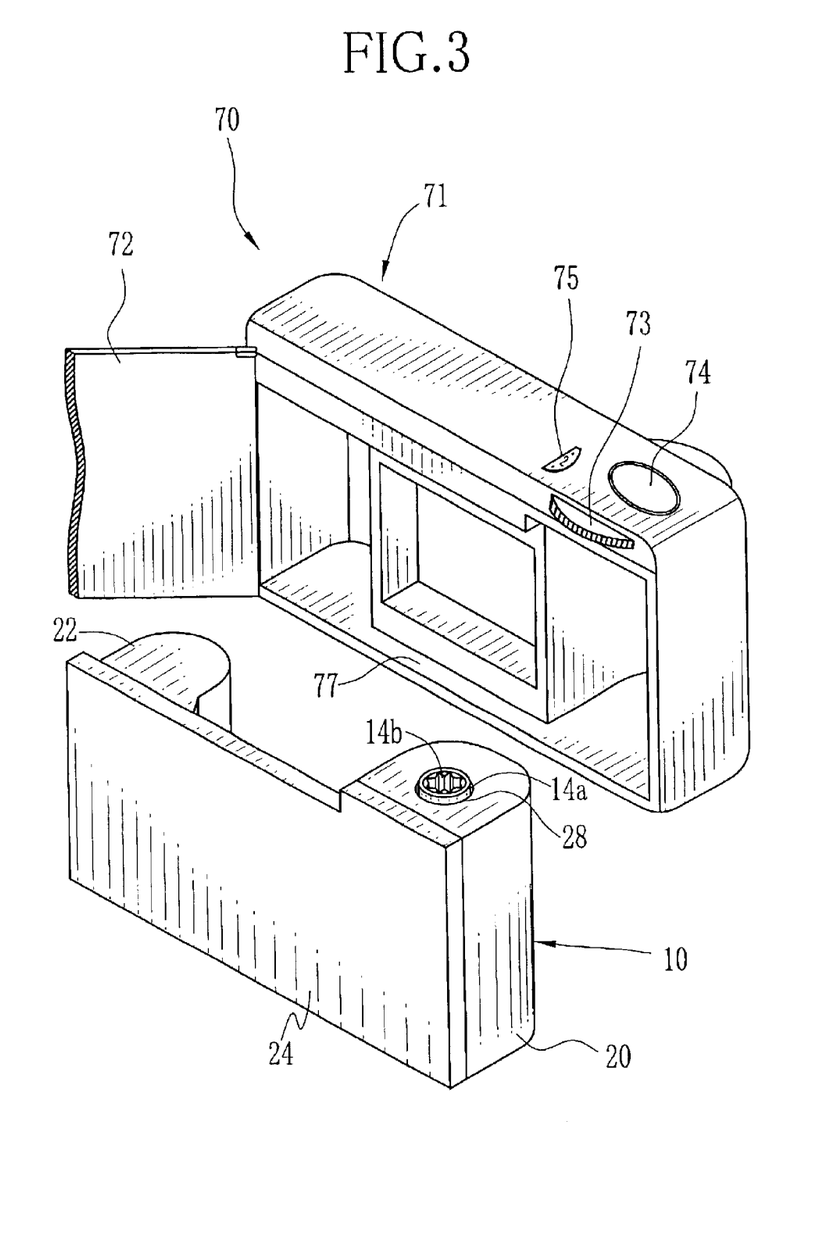
FIG. 3 is an explanatory diagram showing a manner of loading the photo film cartridge of the first embodiment into a camera.

FIG. 3 shows an example of how the photo film cartridge 10 is loaded into a camera 70. The camera 70 has a camera body 71 that contains various photographing mechanisms like a taking lens. In a rear wall of the camera body 71, there are provided a hinged rear lid 72 and a film-winding dial 73 for taking up the photo filmstrip. A shutter button 74 and a display window 75 are provided in a top wall of the camera body 71. Through the display window 75, a film count plate rotating in cooperation with the film-winding dial 73 is observed. The photo film cartridge 10 is contained in a cartridge holding portion 77.

The operation of the photo film cartridge 10 of the present embodiment will be described.

A user opens the rear lid 72 and loads the photo film cartridge 10 into the cartridge holding portion 77. At this time, a single picture frame of the photo filmstrip 12 exposed through the exposure frame 26 is unusable to make an exposure because it has already been exposed to ambient light. However, the film roll chamber 47 is kept in a light-tight manner by the shielding members 30 and 31, so that the photo film roll 12a is not affected by the ambient light. Thus, it is possible to carry out loading operations of the photo film cartridge 10 out of doors or in a lit room.

When the photo film cartridge 10 is loaded, an internal gear 14b of the spool 14a protruding through the opening 28 is engaged with an external gear (not-illustrated) integrally formed in a bottom surface of the film-winding dial 73. Then the photo filmstrip 12 is drawn into the cassette shell 14 by rotating the film-winding dial 73. Accordingly, after loading the photo film cartridge 10, the user turns the film-winding dial 73 to wind the exposed frame into the cassette shell 14 and carry the next frame of the photo filmstrip 12 from the film roll chamber 22 into the exposure frame 26, and the camera 70 becomes ready for making an exposure. Because the photo film roll 12a is contained in the film roll chamber 22 light-tightly by means of the light shielding members 30 and 31, the next frame loaded anew into the exposure frame 26 has not been exposed at the time of loading of the photo film cartridge 10.

After making an exposure by a push of the shutter button 74, the user rotates the film-winding dial 73. With the film-winding dial 73, a count gear (not-illustrated) is engaged inside the camera body 71. When the count gear is rotated to a predetermined angle, the film count plate within the display window 75 advances one step and the photo filmstrip 12 is wound into the cassette shell 14. When the exposed frame of the photo filmstrip 12 has been wound up into the cassette shell 14, an anti-winding mechanism (not-illustrated) is activated to lock the film-winding dial 73. Also during the rotation of the count gear to the predetermined angle, the camera 70 cocks a shutter for the next exposure. The user makes exposures by operating the shutter button 74 and the film-winding dial 73 alternately in such a manner.

After completing the exposures on all picture frames and taking up the photo filmstrip 12 of the last picture frame, the user opens the rear lid 72 to take out the photo film cartridge 10. Since all of the exposed photo filmstrip 12 is wound into the cassette shell 14, it is possible to take out the cartridge 10 out of doors or in a lit room, just as in the case of loading.

The photo film cartridge 10 is sent to a photo lab by way of a photo development store. Since the photo filmstrip 12 is completely wound in the cassette shell 14, it is possible to take the cassette shell 14 out of the cartridge 10 in a lit room.

As with a cassette shell used in another general camera, the cassette shell 14 is subjected to a usual film developing and printing procedures. Now the ISO 135 photo filmstrip 12 is generally used and the processing system has established in a great majority of photo labs, so it is possible to offer efficient printing service at a low cost.

Figure 4:
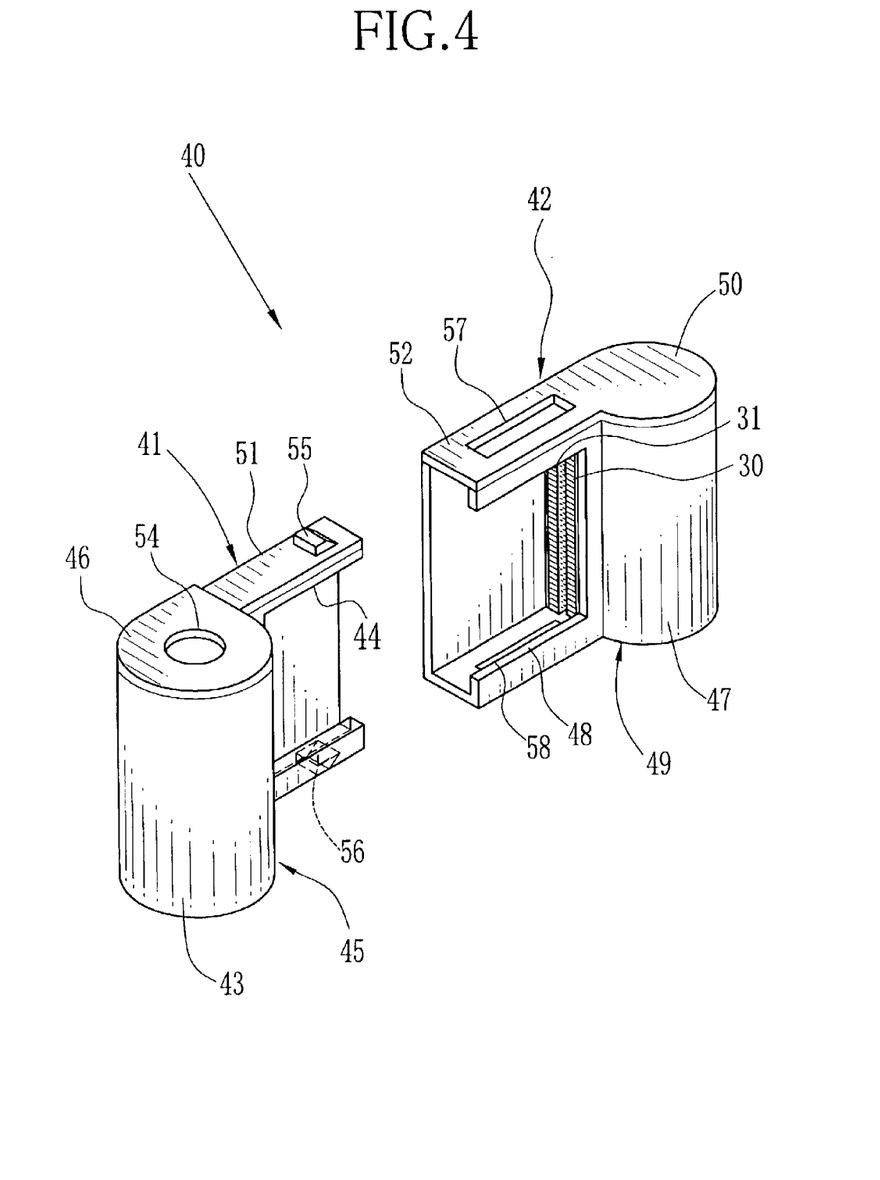
FIG. 4 is a front perspective view of a cartridge shell of a second embodiment before assembly.

FIG. 4 shows a second embodiment of the present invention. A cartridge shell 40 consists of a film take-up unit 41 and a film supply unit 42. The film take-up unit 41 includes a cassette holder 45 with a cassette chamber 43 and a first bridge 51, and a cassette lid 46 fitted over the cassette holder 45. The film supply unit 42 includes a film holder 49 with a film roll chamber 47 and a second bridge 52, and a film lid 50 fitted over the film holder 49.

Figure 5:
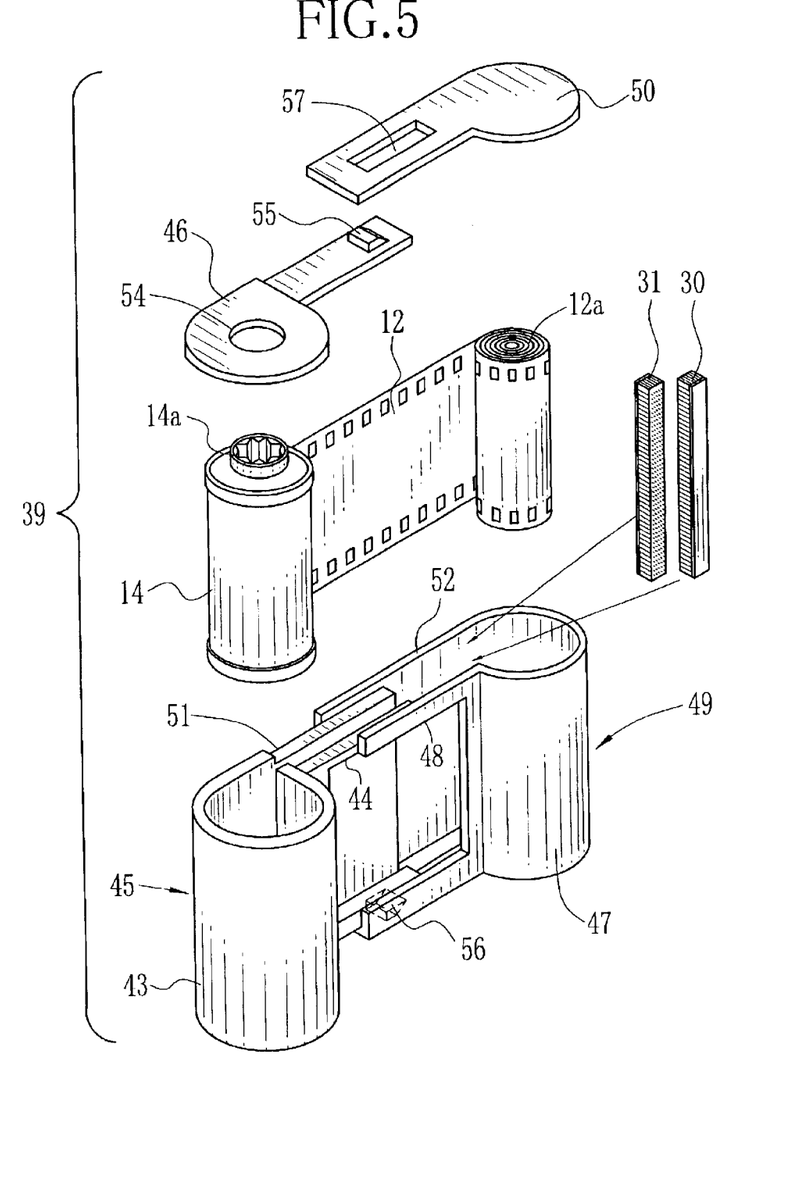
FIG. 5 is an exploded perspective view of a photo film cartridge of the second embodiment.

The first bridge 51 of the film take-up unit 41 is fitted into the second bridge 52 of the film supply unit 52. Cutouts 44 and 48 are formed in the bridges 51 and 52, respectively. When the first bridge 51 is fitted into the second bridge 52, both cutouts 44 and 48 overlap each other to form a variable size exposure frame 53 (refer to FIG. 5B).

Referring to FIG. 5, the cartridge shell 40 contains the same photo filmstrip 12 of ISO 135 format as the one used in the first embodiment. One end of the photo filmstrip 12 is secured to the spool 14a of the cassette shell 14. All of the unexposed frames in the photo filmstrip 12 is pulled out of the cassette shell 14 and rolled up. Then, the cassette shell 14 is contained in the cassette chamber 43, and the photo film roll 12a is contained in the film roll chamber 47 by way of the bridges 51 and 52 as a guide.

Between the film roll chamber 47 and the cutout 48 in the film holder 49, the light shielding members 30 and 31 are disposed to face each other. These light shielding members 30 and 31 prevent the unexposed photo film roll 12a inside the film roll chamber 47 from being exposed to light through the variable size exposure frame 53 formed by the cutouts 44 and 48.

After the cassette shell 14 and the photo filmstrip 12 are contained in the cassette holder 45 and the film holder 49 respectively, the cassette lid 46 and the film lid 50 are put thereon. In order not to expose the photo filmstrip 12, loading processes are carried out in a darkroom, and the light shielding members 30 and 31 and the film lid 50 shield the film roll chamber 47 from ambient light. A top end of the spool 14a protrudes upward through an opening 54 formed in a top wall of the cassette lid 46.

In the film take-up unit 41, the first bridge 51 has projections 55 and 56 on a top and bottom sides, respectively. Also in the film supply unit 42, slots 57 and 58 extending along a film-advance direction are formed in a top and bottom walls of the second bridge 52. The film take-up unit 41 is so fitted into the film supply unit 42 that the projections 55 and 56 are engaged with the slots 57 and 58, respectively. Accordingly, the film take-up unit 41 and the film supply unit 42 are relatively movable in the film-advance direction within a length of the slots 57 and 58.

Figure 6A:
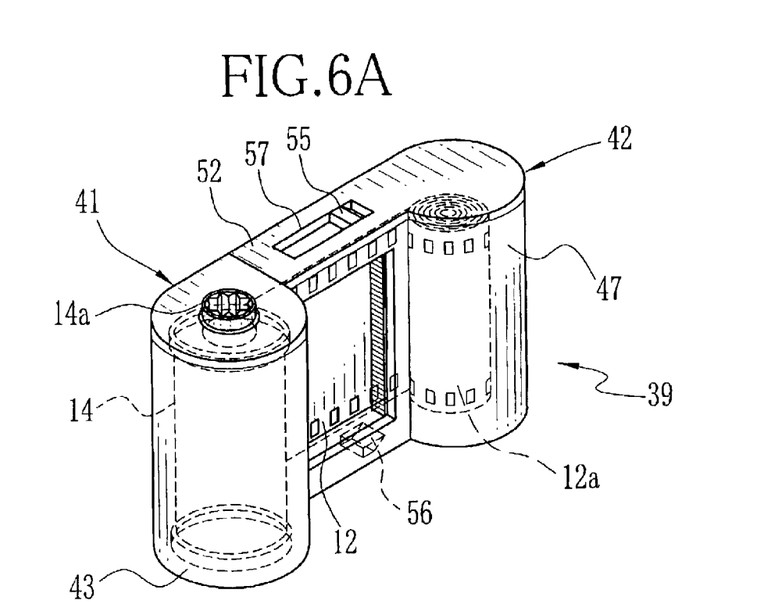
FIG. 6A is a front perspective view of the photo film cartridge of FIG. 5 in a non-used situation.

When a photo film cartridge 39 is not used, as shown in FIG. 6A, the film take-up unit 41 slides inwardly into the film supply unit 42 until the projections 55 and 56 are positioned at ends of a film roll chamber side of the slots 57 and 58. At this time, the first bridge 51 is fully overlapped with the second bridge 52, so that the photo film cartridge 39 becomes small in size. Thus, it is more convenient to carry the photo film cartridge 39.

Figure 6B:
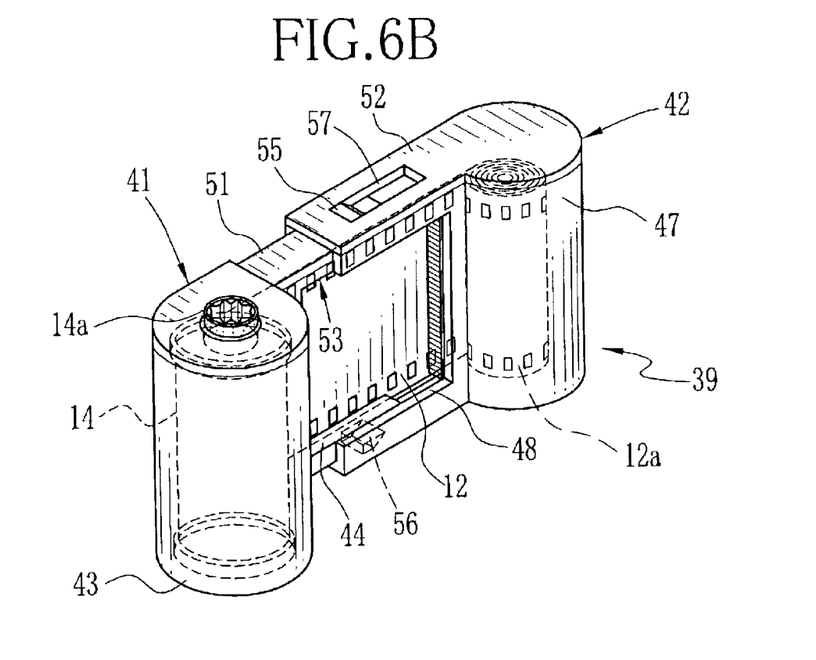
FIG. 6B is a front perspective view of the photo film cartridge of FIG. 5 in a used situation.

To use the photo film cartridge 39, as shown in FIG. 6B, the film take-up unit 41 is pulled out in the film-advance direction until the projections 55 and 56 are positioned at the other ends of the slots 57 and 58. At this time the variable size exposure frame 53 formed by the cutouts 44 and 48 becomes in size of the single picture frame.

Figure 7:
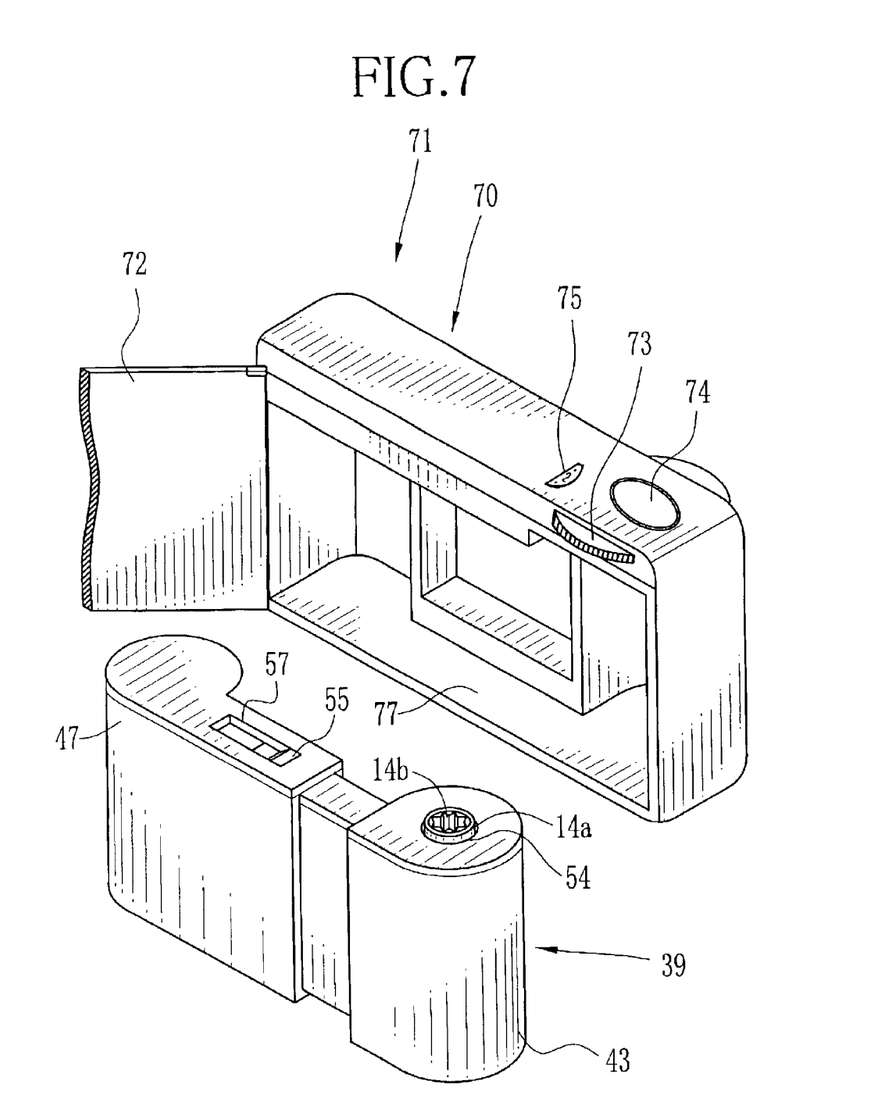
FIG. 7 is an explanatory diagram showing a manner of loading the photo film cartridge of the second embodiment into the camera.

Referring to FIG. 7, as in the case of the first embodiment, this photo film cartridge 39 is loaded into the camera 70 and the user makes an exposure on the photo filmstrip 12. Loading the photo film cartridge 39, the unexposed photo film roll 12a is not exposed because the photo film roll 12a in the film supply unit 42 is held light-tightly by the light shielding members 30 and 31.

Figure 8:
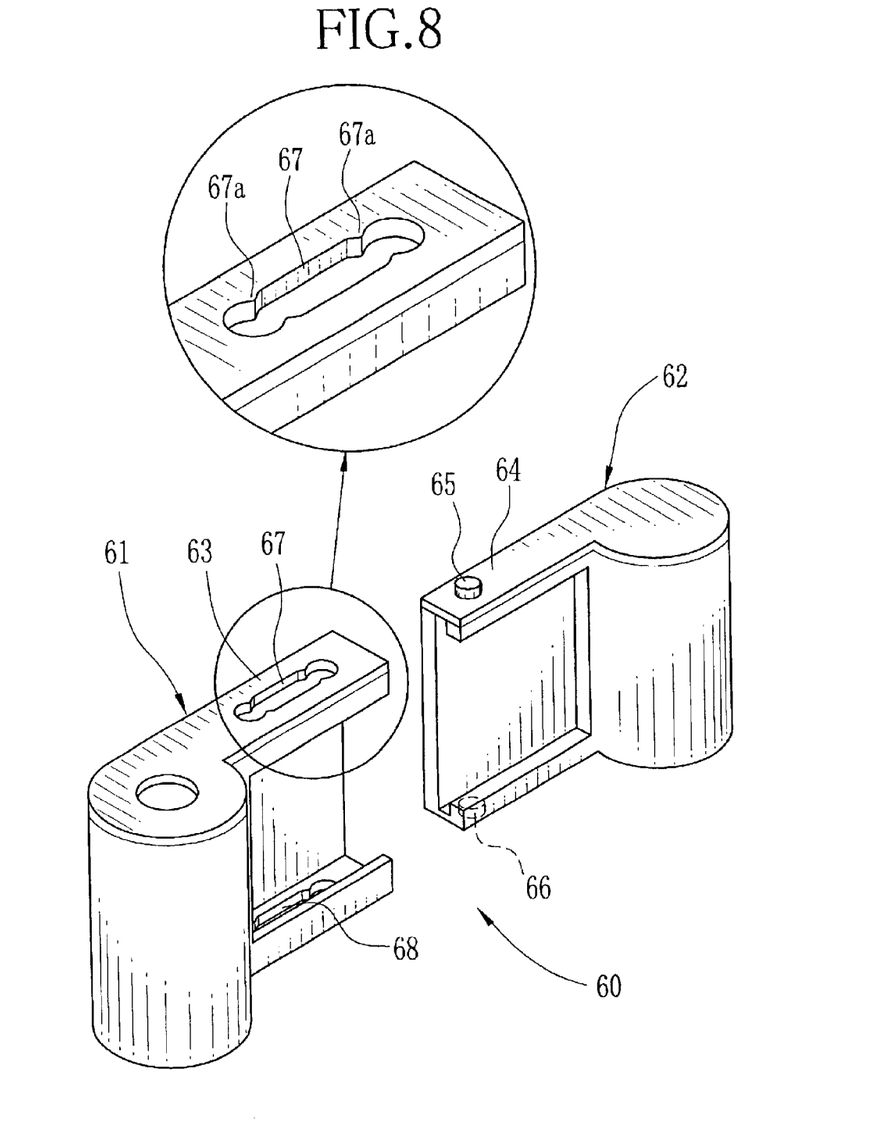
FIG. 8 is a partly enlarged front perspective view of a cartridge shell of a third embodiment before assembly.

As a third embodiment, FIG. 8 shows a cartridge shell 60 which is provided with click mechanisms at the ends of slots. A bridge 64 of a film supply unit 62 is so formed smaller than a bridge 63 of the film take-up unit 61 as to be fitted therein. Cylindrical projections 65 and 66 are provided on a top and bottom walls of the bridge 64. The cylindrical projections 65 and 66 fit inside the slots 67 and 68 formed in a top and bottom walls of the other bridge 63. The slot 67 becomes narrow in both end portions, so that circular click mechanisms 67a are formed to hold the projection 65 at either end of the slot 67. Identical click mechanisms are formed in both end portions of the other slot 68.

According to the third embodiment, the photo film cartridge becomes stable by holding the projections 65 and 66 at either end in the slots 67 and 68. Thus, the user can easily handle the photo film cartridge.

Figure 9:
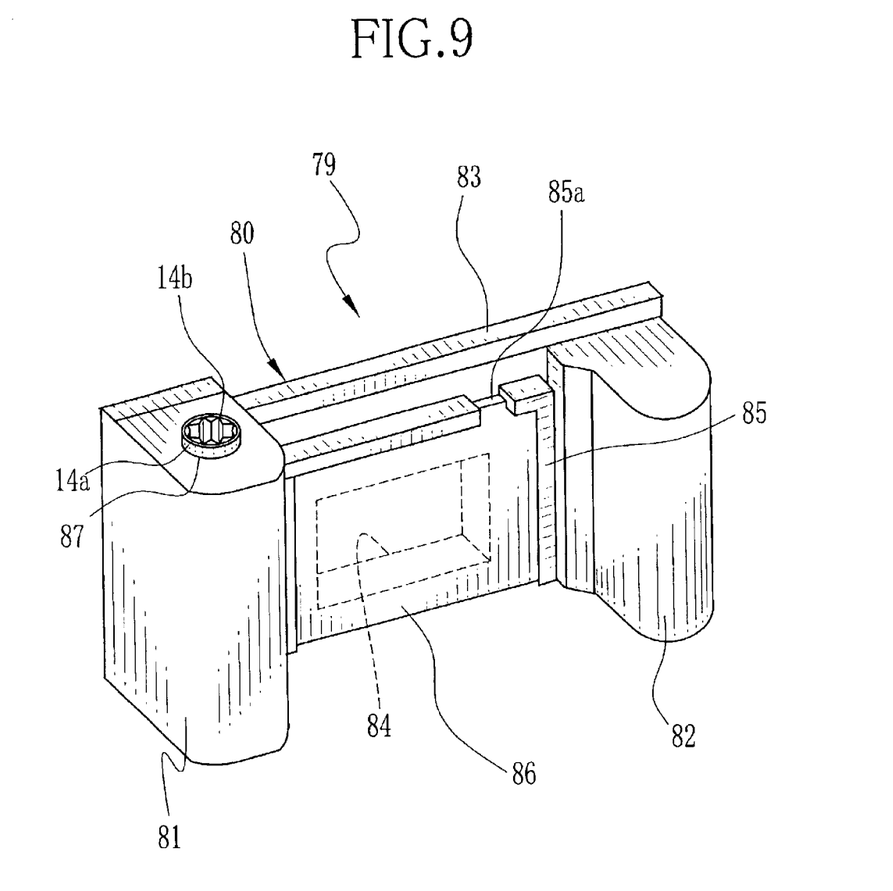
FIG. 9 is a front perspective view of a photo film cartridge of a fourth embodiment.

FIG. 9 shows a photo film cartridge 79 according to the fourth embodiment. The ISO 135-type photo filmstrip 12 and the cassette shell 14 are contained in a cartridge shell 80. The cartridge shell 80 has a cassette chamber 81 for containing the cassette shell 14 having the spool 14a to which one end of the photo filmstrip 12 is secured, a film roll chamber 82 for containing the unexposed photo film roll 12a which is pulled out of the cassette shell 14 in advance, and a bridge 83 formed between the cassette chamber 81 and the film roll chamber 82 for guiding the photo filmstrip 12. The bridge 83 has an exposure frame 84 through which a single picture frame of the photo filmstrip 12 is exposed.

An attachment frame 85 is provided on a top, right, and left sides of the exposure frame 84. A light shielding plate 86 is fitted into the attachment frame 85 from a bottom side of the exposure frame 84. The light shielding plate 86 prevents light from getting into the cartridge shell 80 through the exposure frame 84. A notch 85a is formed in a top side of the attachment frame 85. As will be further described in the latter part, through the notch 85a a projection provided inside a camera extrudes the light shielding plate 86 outside, when the photo film cartridge 79 is loaded into the camera.

Figure 10:
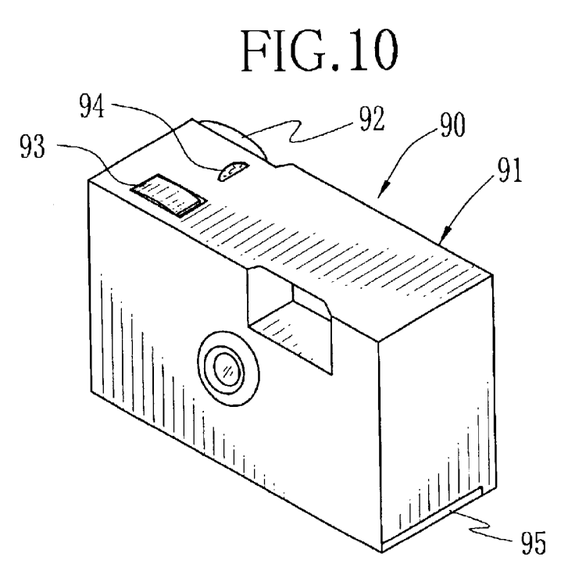
FIG. 10 is a front perspective view of a camera which is loaded with the photo film cartridge of FIG. 9.

FIG. 10 shows a camera 90 using the photo film cartridge 79 of the fourth embodiment. A film-winding dial 92 is provided in an upper portion of a rear wall of a camera body 91. A shutter button 93 and a display window 94 are provided in a top wall of the camera body 91. Through the display window 94, a counter plate rotating in cooperation with the film-winding dial 92 is observed. A hinged bottom lid 95 is provided in a bottom wall of the camera body 91.

Figure 11:
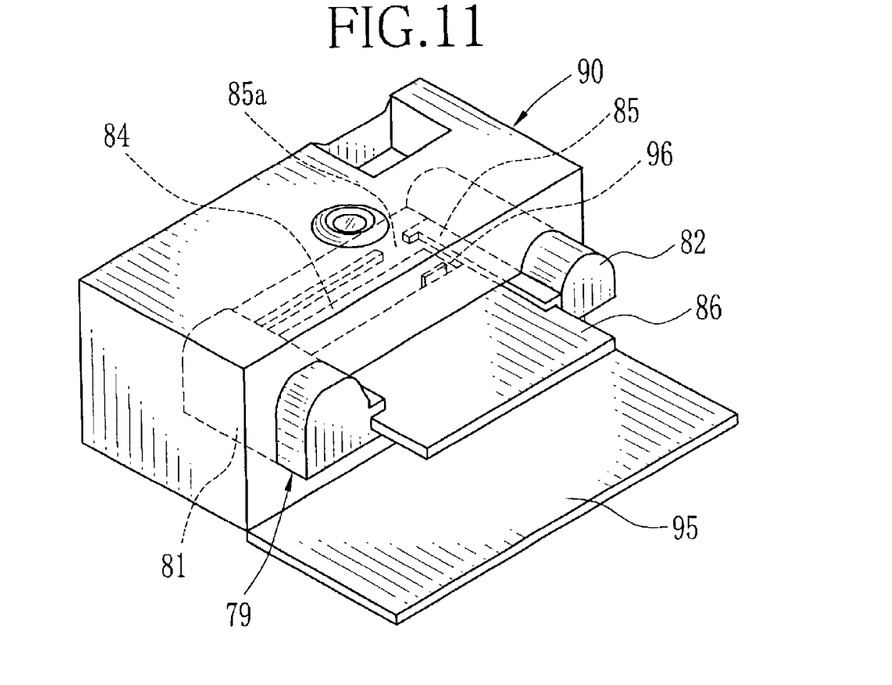
FIG. 11 is an explanatory diagram showing a manner of loading the photo film cartridge of FIG. 9 into the camera.

Referring to FIG. 11, the user opens the bottom lid 95 and inserts the photo film cartridge 79 with the light shielding plate 86 into the camera 90. The light shielding plate 86 shields the inside of the cartridge shell 80 against light, so the user can carry out this film loading operation out of doors or in a lit room.

When the photo film cartridge 79 is inserted into the camera 90, a projection 96 provided on an inner surface of a front wall of the camera body 91 passes through the notch 85a of the attachment frame 85. Then the light shielding plate 86 is extruded outside from the camera body 91, and the exposure frame 84 is gradually opened. At this time, outside light does not reach the photo filmstrip 12 because the exposure frame 84 is inside the camera 90. When the photo film cartridge 79 is completely inserted, the internal gear 14b of the spool 14a protruding through an opening 87 of the cassette chamber 81 is engaged with an external gear (not-illustrated) integrally formed in a bottom surface of the film-winding dial 92, so the photo filmstrip 12 is wound up into the cassette shell 14 by rotation of the film-winding dial 92. The user takes the extruded light shielding plate 86 off the bottom surface of the camera body 91 and closes the bottom lid 95, and then the camera 90 is ready to make an exposure.

After cassette loading, as in the case of the first, second, and third embodiments, the user can take exposures by operating the shutter button 93 and the film-winding dial 92 alternately. Furthermore, if the user opens the bottom lid 95 out of doors or in a lit room and changes the used photo film cartridge 79 for a new one, it is possible to make other exposures repeatedly. After use, the photo film cartridge 79 of the fourth embodiment is sent to the photo lab too. Since the photo film cartridge 79 also uses the 135-type photo filmstrip 12, it is possible to offer the efficient printing service at a low cost, as usual.

In addition to that, the photo film cartridges of the first to fourth embodiments will be reused as follows. After taking out the cassette shell 14, the cartridge shells 10, 40, 60, and 80 are reclaimed by a maker. The maker replaces the light shielding members 30 and 31 with new ones, or fits the new light shielding plate 86 into the attachment frame 85. A new cassette shell 14 with the photo filmstrip of ISO 135 format, prepared by the manufacturer, is contained in the cassette chamber, and the unexposed photo film roll 12a pulled out of the cassette shell 14 and rolled up is contained into the film roll chamber, and then the rear cover 18 or the cassette and film lids 45 and 46 is/are assembled.

In the first, second, and third embodiments, the photo film cartridge is loaded from the rear side of the camera 70. However, the photo film cartridge is also applicable to a type of camera into which the photo film cartridge is loaded from a bottom side like in FIG. 11. In this case, it is unnecessary to provide the projection 96 inside the camera 90.

In the first to fourth embodiments, the photo film cartridge uses the photo filmstrip of ISO 135 format, but the IX240-type photo filmstrip is usable too.

In the above embodiments, the user loads the photo film cartridge into the camera after the purchase of the camera. However, the present invention includes a camera which is pre-loaded with the photo film cartridge in a factory (i.e. designated as the lens-fitted photo film unit). There are two types of lens-fitted photo film unit, namely a cartridge-changeable-type in which the pre-loaded photo film cartridge is changeable by the user, and an unchangeable-type. The former type of lens-fitted photo film unit can take a photograph repeatedly, if the user loads the newly purchased photo film cartridge therein after the ejection of the pre-loaded and exposed photo film cartridge.

The light shielding plate 86 may open the exposure frame 84 by sliding or rotating inside the photo film cartridge 79, besides removing therefrom.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A photo film cartridge loaded into a camera, comprising:
    a cartridge shell;
    a photo filmstrip of ISO 135 or IX-240 format contained in said cartridge shell;
    a cassette contained in said cartridge shell, said cassette having a spool to which one end of said photo filmstrip is secured; and
    a light shielding portion provided in said cartridge shell to prevent unexposed said photo filmstrip from being exposed;
    wherein the cartridge shell comprises:
        a film take-up unit having a cassette chamber for containing said cassette and a first bridge; and
        a film supply unit having a film roll chamber for containing a roll of said unexposed photo filmstrip pulled out of said cassette and rolled up, and a second bridge;
    wherein a first cutout is formed in said first bridge, a second cutout is formed in said second bridge, and said first and second cutouts form an exposure frame when said first and second bridges are fitted into each other.

2. A photo film cartridge as recited in claim 1, wherein one of said first and second bridges is provided with a projection, the other one of said first and second bridges is provided with a slot for engaging with said projection, said first and second bridges are movably fitted into each other within the confines of a length of said slot, whereby a size of said exposure frame is changed.

3. A photo film cartridge as recited in claim 2, wherein said light shielding portion has a pair of light shielding members fixed between said film roll chamber and said second cutout to prevent light from getting into said film roll chamber through said exposure frame.

4. A photo film cartridge as recited in claim 3, wherein each of said light shielding members has a plate secured to an inner surface of said film supply unit and a piece of plush glued on said plate, and said photo filmstrip is held between said plush of said light shielding members.

5. A photo film cartridge as recited in claim 2, wherein said cartridge shell becomes smallest in size when said projection is at one end of said slot, and wherein said cartridge shell becomes largest in size and said exposure frame forms a single picture frame when said projection is at the other end of said slot.

6. A photo film cartridge as recited in claim 5, wherein a click mechanism is formed at both ends of said slot in order to secure said projection at either end of said slot.

7. A photo film cartridge loaded into a camera which has a light-tight camera body and an openable lid for taking out said photo film cartridge from said camera body, said photo film cartridge comprises:
    a photo filmstrip of ISO 135 or IX-240 format;
    a cassette for winding up said photo filmstrip, said cassette having a spool to hold one end of said photo filmstrip;
    a cassette chamber for containing said cassette;
    a film roll chamber for containing said photo filmstrip unexposed and rolled up;
    a bridge provided between said cassette chamber and said film roll chamber, said bridge being provided with an exposure frame for exposing a single picture frame of said photo filmstrip, and
    a light shielding portion provided between said exposure frame and said film roll chamber in order to shield said photo filmstrip in said film roll chamber from ambient light through said exposure frame.

8. A photo film cartridge as recited in claim 7, wherein said cartridge shell comprises a front cover and a rear cover combined with each other, and said cassette chamber, said film roll chamber, and said exposure frame are formed in said front cover.

9. A photo film cartridge as recited in claim 8, wherein said light shielding portion has a pair of light shielding members fixed between said film roll chamber and said exposure frame to prevent light from getting into said film roll chamber through said exposure frame.

10. A photo film cartridge as recited in claim 9, wherein each of said light shielding members has a plate secured to said front cover or said rear cover and a piece of plush glued on said plate, said photo filmstrip is held between said plush of said light shielding members.

11. A camera comprising:

a light-tight camera body; and a cartridge holding portion formed in said camera body, said cartridge holding portion being loaded with a photo film cartridge separate from the camera body, so that the cartridge is contained within the light-tight camera body, said photo film cartridge comprising;

A. a light-tight cartridge shell;

B. a photo filmstrip of ISO 135 or IX-240 format contained in said cartridge shell;

C. a cassette contained in said cartridge shell, said cassette having a rotatable spool to which one end of said photo filmstrip is secured; and D. a light shielding portion provided in said cartridge shell to prevent said photo filmstrip from being exposed;

wherein the cassette is constructed to be lightproof even when the cassette is not contained within the cartridge shell.

12. A camera as recited in claim 11, wherein said cartridge shell consists of a lightproof front cover and a lightproof rear cover, said front cover comprises:

a cassette chamber for containing said cassette;

a film roll chamber for containing a roll of said unexposed photo filmstrip drawn out of said cassette; and a bridge provided between said cassette chamber and said film roll chamber, said bridge having an exposure frame for exposing a single picture frame of said photo filmstrip.

13. A camera as recited in claim 12, wherein said light shielding portion has an openable light shielding plate to cover said exposure frame.

14. A method for loading a photo film cartridge into a camera, said photo film cartridge comprising a cassette containing a rotatable spool; a roll of a photo filmstrip of ISO 135 or IX-240 format drawn out of said cassette with one end of said photo filmstrip secured to said spool; a cassette chamber for containing said cassette; a film roll chamber for containing said roll of said photo filmstrip; a bridge provided between said cassette chamber and said film roll chamber; an exposure frame formed said bridge for exposing a single picture frame of said photo filmstrip; a light shielding plate for openably covering said exposure frame; said method comprising the steps of:

loading said photo film cartridge into said camera; and opening said exposure frame by means of moving said light shielding plate, wherein said light shielding plate opens said exposure frame in cooperation with loading of said photo film cartridge into said camera.

15. A method as recited in claim 14, wherein a stopper provided inside said camera thrusts said light shielding plate in order to remove said light shielding plate from said bridge, when said photo film cartridge is inserted into said camera.

* * * * *